May 11, 1937.  E. J. KINGSBURY  2,080,319
VARIABLE SPEED BELT DRIVE
Filed Aug. 7, 1933  2 Sheets-Sheet 2
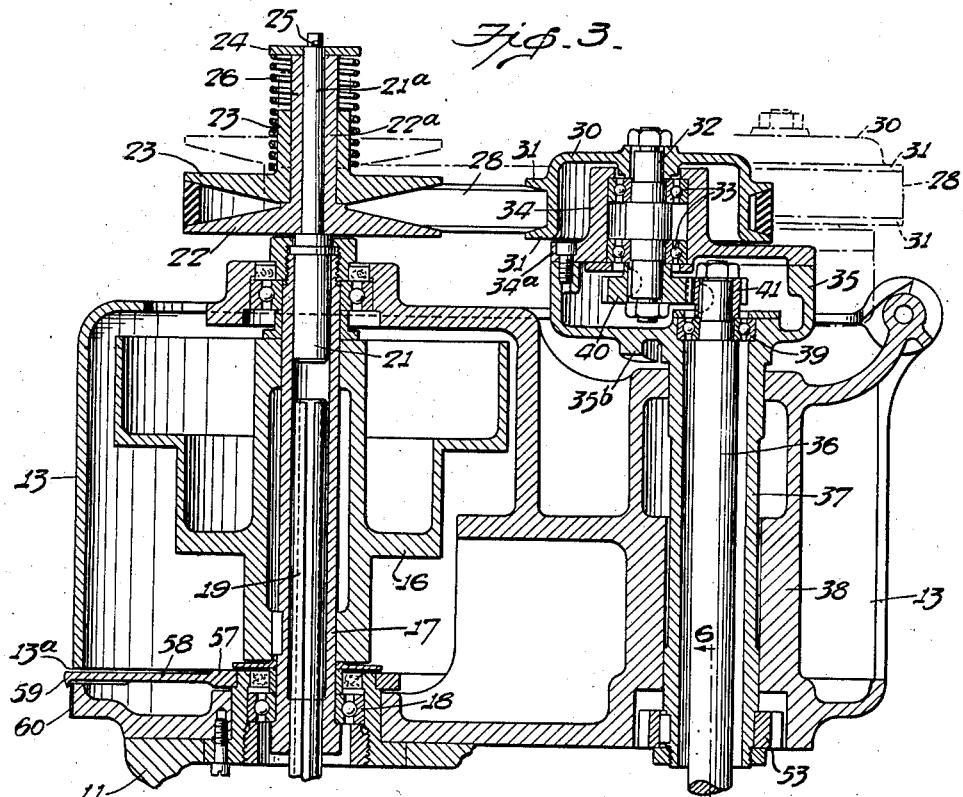
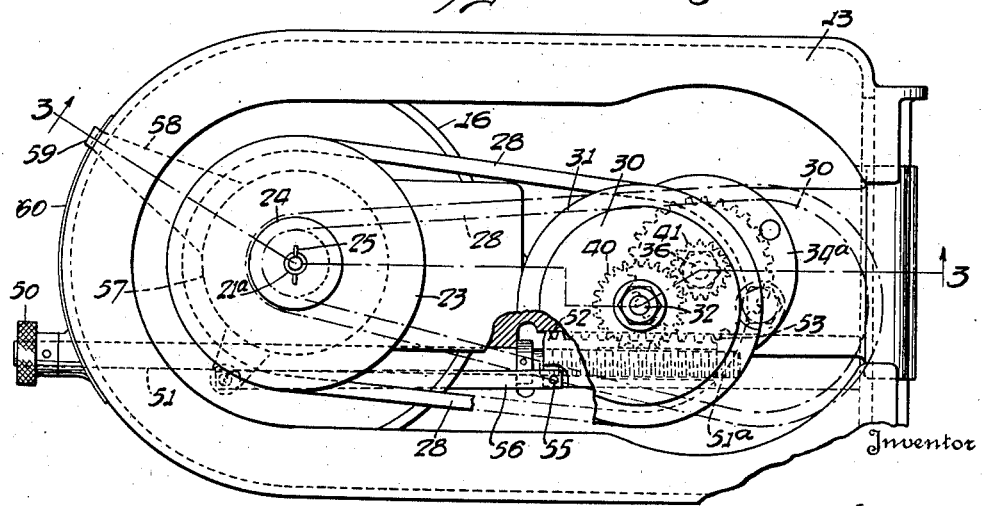
Inventor
Edward J. Kingsbury
By
Attorneys Patented May 11, 1937

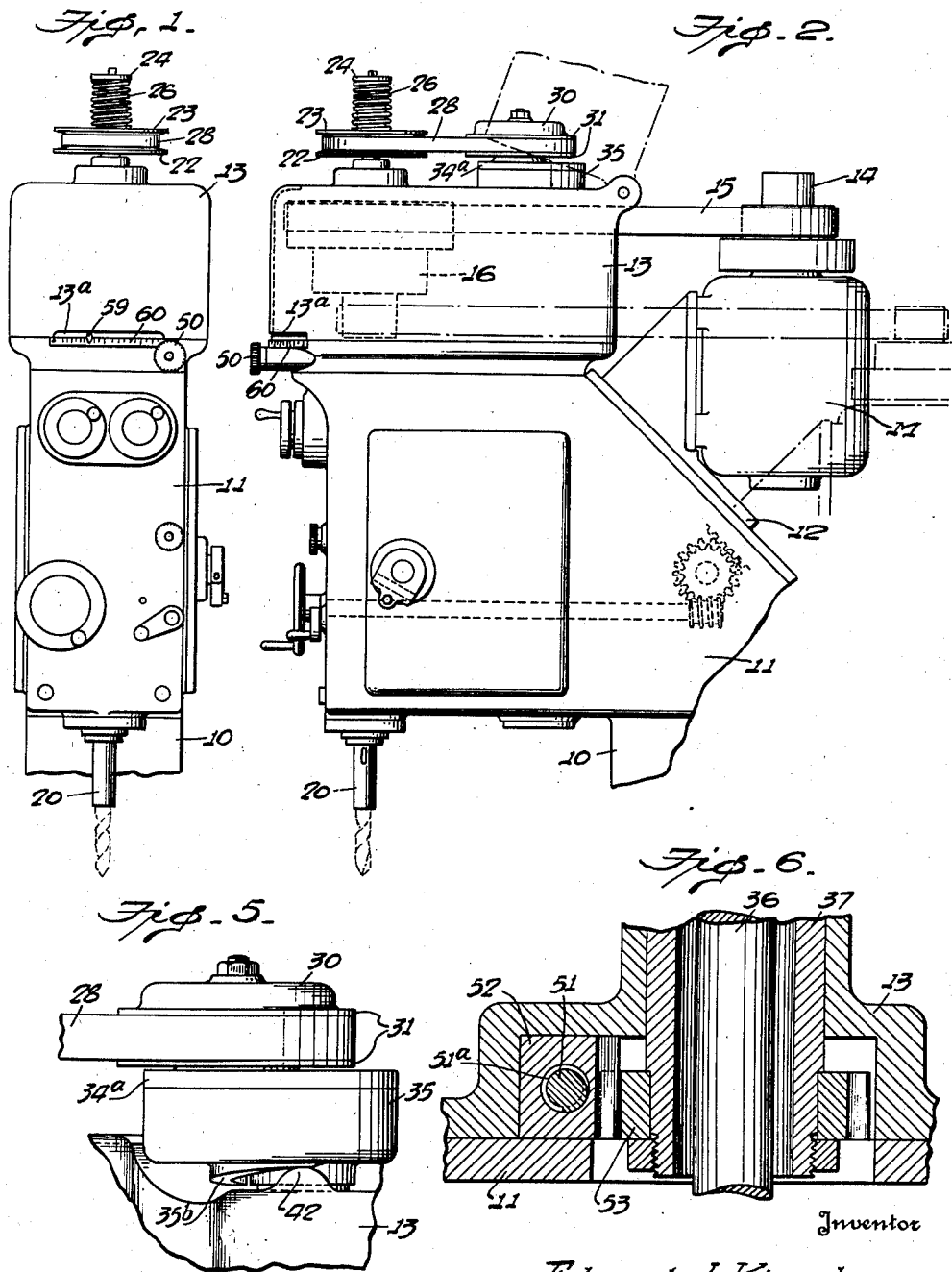

2,080,319

UNITED STATES PATENT OFFICE 2,080,319

VARIABLE SPEED BELT DRIVE

Edward Joslin Kingsbury, Keene, N. H.

Application August 7, 1933, Serial No. 684,063

2 Claims. (Cl. 74—217)

This invention relates to variable speed belt drive, by which the speed ratio may be varied by small increments.

The invention is capable of wide application, but is illustrated in the accompanying drawings as applied to a drilling machine of the type likewise disclosed in my copending application Serial No. 677,953, filed June 27, 1933.

One of the features of the present invention is the provision of a pulley of variable effective diameter in conjunction with a pulley of substantially fixed diameter, this latter pulley being adjusted toward and from the said variable pulley by means operating to turn an eccentric mounting provided for the pulley of fixed diameter.

Another feature is the provision, in the mounting, of means for adjusting the position of the pulley of fixed diameter, so that the connecting belt at all times is in proper tracking relationship with the two pulleys.

A further feature of the invention is the provision of means operated with the adjusting system for indicating the adjustment and therewith the ratio at which the system is operating.

With these and other features as objects in view, an illustrative form of construction is shown on the accompanying drawings in which:

Figure 1 is a front elevation of a portion of the drilling machine.

Figure 2 is a corresponding side elevation.

Figure 3 is an upright section substantially on line 3—3 of Figure 4.

Figure 4 is a plan view of the drive, with the parts broken away for clearness.

Figure 5 is a side elevation on the scale of Figure 3, of the height adjusting means for the pulley of fixed diameter.

Figure 6 is an upright transverse section, on a larger scale, substantially on line 6—6 of Figure 3.

In these drawings, the drilling machine is illustrated as having a standard 10 and an upper head 11 containing the feeding mechanism (not shown), a support 12 for an electric driving motor M, and a top housing 13 containing and supporting the general driving system whereby the desired ratios of speed and feed may be obtained. The motor M has a cone pulley 14 which is connected by a belt 15 with a cone pulley 16 mounted (Fig. 3) in keyed relationship to a sleeve 17. By variation of the position of the motor and the pulleys with respect to one another and to the belt, variable ratios may be obtained in the manner described in my aforesaid copending application.

According to the present application, the sleeve 17 is illustrated as supported by bearings 18 and as being in splined relationship with the drill spindle 19 which extends downwardly through the head 11 and is provided with a drill holder 20 in the usual way. The sleeve 17 also is in driving relationship with a shaft 21 which extends upwardly out of the housing 13 and is provided with a conical pulley cheek 22 which has no relative axial movement with respect to the shaft 21 or its reduced extension 21a. The conical cheek 22 is extended upwardly by a sleeve 22a about which is slidably mounted the sleeve 23a of a second conical pulley cheek 23. An abutment plate 24 surrounds the reduced portion 21a and is held against downward movement by the sleeve 22a and against upward movement by a retaining pin 25. A spring 26 constrains the cheek 23 toward its downward position.

The conical shapes of the two cheeks conform to the shape of the belt 28 which is of V-type.

A pulley 30 is provided with cheeks 31 which likewise conform to the belt 28, and is secured to a pulley shaft 32 which is mounted by bearings 33 in an offset portion 34 formed on a cap 34a for a housing 35 which may be rocked about the axis of the feed shaft 36. This housing 35 is provided for the purpose with a sleeve 37 which is free for movement in a web portion 38 of the housing 13. The sleeve 33 has at least one bearing 39 for supporting the feed shaft 36. The lower end of the pulley shaft 32 is provided with a gear 40 which is in mesh with a gear 41 on the upper end of the feed shaft 36.

The lower surface of the housing 35 is provided with a cam projection 35b (Figs. 3 and 5) which cooperates with a member 42 (Fig. 5) upon the housing 13, so that an upward and downward motion is imparted to the housing 35 as it turns about its axis.

This turning movement of the housing 35 can be effected by mechanical means from the manually rotatable knob 50 which is secured to a spindle 51 having screw threads 51a at the inner end thereof. A rack 52 (Figs. 4 and 6) is provided with internal screw threads for receiving the threads 51a. This rack is in mesh with a gear or gear segment 53 secured to the sleeve 37. It will be noted that the rack 52 is of greater height than the gear 53, and the latter has space in the housing 13 for its upward and downward movement with the sleeve 37.

To provide an external indication of the prevailing speed ratio, a pivot 55 is provided on the rack 52 for connection to a link 56 which in turn is pivoted to a rocker member 57 having an indicating arm 58 projecting externally of the housing 13 through an orifice 13a and provided on such exterior with a pointer 59 cooperating with a scale 60 on the housing.

It will be understood that the feed shaft 36 may operate through any type of mechanism for producing upward and downward movements of the drill spindle 19 and the drill holder 20, in the usual way. The feed is thus related to the speed, as both movements are derived from the sleeve 17. The ratio of the feed with respect to the speed may be varied by moving the sleeve 37 about its axis. If this movement is in a counterclockwise direction (Fig. 4), the tension on both runs of belt 28 is increased and the belt forces the pulley cheek 23 away from the pulley cheek 22, against the action of spring 26, so that the effective diameter of the pulley comprising cheeks 22 and 23 is decreased, (dash-and-dot position, Figs. 3 and 4) and a greater number of revolutions of sleeve 17 is required for a given number of revolutions of the pulley 30. At any angular position of sleeve 37, however, the pulley 30 and its shaft 32 remain in driving relationship with the feed shaft 36.

It will be noted that the upward movement of the pulley cheek 23 results in a raising of the belt 28. This is compensated, according to the present invention, by the effect of the cam 35b and member 42 in raising the housing 35 and the associated members incduing the feed shaft 36.

The ratio of drive is indicated, as stated above, by the relative position of the indicator 59.

A movement of the knob 50 in the opposite direction, resulting in a clockwise movement of the member 35 and the eccentrically mounted pulley shaft 32 thereon, results in a releasing of the tensions in the runs of belt 28, so that the pulley cheek 23 may move downward under the constraining action of its spring 26, and the belt 28 moves outwardly so that the effective diameter of the pulley comprised of cheeks 22 and 23 is increased, (full lines, Figs. 3 and 4) with a corresponding increasing of the speed ratio of movement of pulley 30.

It is obvious that the invention is not limited to the form of construction shown, but that it may be employed in many ways within the scope of the appended claims.

Having thus described the invention, what I claim as new and desire to secure by Letters Patent, is:—

1. A variable speed belt drive including a first pulley having relatively movable conical cheeks and means for urging one said cheek toward the other cheek, a V-belt cooperating with said pulley, a second pulley cooperating with said belt, a frame, an eccentric mounting for said second pulley whereby it may be moved arcuately toward and from the first pulley, cooperating means on said frame and mounting for moving the mounting along the axis of said second pulley coordinately with the arcuate movement of the mounting, said mounting having gear teeth thereon, a manually rotatable spindle, and means moved by said spindle during the rotation thereof and meshing with said gear teeth for producing movement of said mounting.

2. A variable speed belt drive including a housing, a first rotatable member mounted for rotation and held against axial movement, a second rotatable member mounted for rotation and for relative axial movement; a first pulley including a first cheek held against axial movement on said first member, a movable cheek, and means for urging said movable cheek towards said first cheek, said cheeks being adapted for receiving a belt at different effective diameters, a mounting movable about the axis of said second member and connected with the second member so that they move axially together, a pulley rotatable about an axis on said mounting which is eccentric to the axis of said second member, driving means connecting said pulley and second member, cooperating elements on the housing and mounting for producing an axial movement of the mounting and second member when the mounting is moved about the axis of the second member, and means for moving said mounting about said axis of the second member.

EDWARD JOSLIN KINGSBURY.